United States Patent Office 3,385,776
Patented May 28, 1968

3,385,776
PROCESS FOR ALLOYING LITHIUM TO
SEMI-CONDUCTOR MATERIAL
Hans Juergen Volker Fiedler, Dundas, Ontario, Canada, assignor to Nuclear Diodes, Inc., Highland Park, Ill., a corporation of Illinois
No Drawing. Filed June 11, 1965, Ser. No. 463,328
7 Claims. (Cl. 204—130)

The present invention relates to a new and improved process for alloying lithium to semi-conductor material.

The manufacture of lithium-drift solid state detectors comprises two basic operational steps: a first step of coating lithium on to a surface and diffusing it to a selected depth into a semi-conductor ingot, and a second step of drifting the lithium from its diffusion depth substantially throughout the volume of the ingot. The quality of the solid state detector so manufactured is dependent in large measure on the success achieved in coating the surface evenly and in uniformly diffusing the lithium into the ingot. For very practical reasons the quality of the detector is further enhanced as it is possible to extend this control over greater areas of the semi-conductor surface and from one face, to many faces, and conceivably to all of the faces of the semi-conductor ingot. To date manufacturing techniques have been limited to coating and diffusing but one surface of seim-conductor ingot. Accordingly, it is an object of the present invention to provide a process and a technique for successfully diffusing lithium into a germanium ingot from its many faces.

It is a further object of the present invention to provide an improved process for diffusing lithium into semi-conductor ingot by simplified and less expensive means but at the same time achieving rigid diffusion control.

In its broadest aspect, it is an object of the present invention to devise means for utilizing electrolytic apparatus in order to achieve lithium diffusion in a semi-conductor ingot.

A more specific object of the invention is an electrolytic process wherein diffusion control is achieved by mixing a lithium salt with an electrolytic carrier so as to provide a mixture having a melting point which is in the range of the optimum diffusion temperature for lithium in the selected semi-conductor material, heating the mixture to the optimum diffusion temperature, immersing the semi-conductor ingot as a cathode element into the heated mixture in the presence of an anode element, and applying electric current to the anode-cathode elements at a selected rate and for a limited time to control deposit and diffusion.

Further objects and features of the present invention pertain to the particular means and methods whereby the above identified objects are attained.

Turning to the invention itself, lithium salts such as might be useful in an electrolytic process have a melting point which is much in excess of the optimum diffusion temperature for lithium itself in semi-conductor materials such as germanium or silicon. Accordingly, in the controlled electrolytic apparatus of the present invention, lithium salt is mixed with an electrolyte carrier of a low melting point characteristic in proportions so as to reduce the melting temperature of the mixture to the selected range of temperature control. This mixture, when contained within a crucible and maintained at the selected melt temperature is subjected to electrolytic action by connecting the semi-conductor ingot, plate, or slice, as the cathode element in the electrolytic apparatus and further including within the electrolyte an appropriate anode element. Thereupon the current is adjusted and regulated to attain an even depositing of lithium on the ingot surfaces at a continuous rate. The electrolytic process is permitted to continue for a time sufficient to achieve diffusion of the lithium in the semi-conductor material to a selected diffusion depth.

At the end of the electrolysis period the cathode may be removed from the bath and permitted to cool.

In one example of the method in accordance with the invention for diffusing lithium into a germanium semi-conductor material, a lithium salt, here selected to be lithium chloride, is mixed with an alkali salt, for example, potassium chloride, in a one-to-one mixture so as to reduce the melting point of the resulting mixture to a range of 370° C. to 400° C. The proportion of mixture may be controlled to vary accordingly the mixture melt temperature. This mixture is then placed into a crucible, which in the preferred arrangement is of graphite so that it may be made the anode of the electrolytic apparatus. Graphite is selected inasmuch as the mixture releases chlorine which will attack other types of anode material but will not attack graphite. Accordingly, the anode material may be changed to accommodate demands.

The crucible containing the lithium chloride-potassium chloride mixture is then placed inside a muffle or crucible furnace and is heated to at least the mixture melt temperature or just slight above. Thereupon the cathode lead is attached to the germanium ingot to be alloyed and submerged to the desired depth in the molten mixture. This submersion might be limited to but one face of the germanium ingot or it might, in extreme, go to the total surface area of the ingot. Thereupon voltage and current is applied to the cathode and anode so as to develop an appropriate alloying current.

Where a one-to-one mixture of lithium chloride and potassium chloride is employed and the electrolytic bath temperature is maintained in the range of 400° C. to 450° C., it is found that the desired lithium concentration is achieved in the final product by controlling the current to be approximately .02 ampere per square centimeter of cathode area to be alloyed. For a germanium ingot having an alloying area of 20 to 30 square centimeters, 0.5 ampere has been found to provide the desired lithium concentration. In this arrangement voltage is noted to be in the near range of 2.5 volts.

As the lithium is deposited on to the material, it diffuses into the ingot to a depth, the diffusion depth, which is a function of both the temperature of the bath and the length of the time that the material is subjected to the electrolytic action. Typical time-temperature-depth results for a germanium ingot are:

| Temperature, ° C. | Time, min. | Diffusion depth, mm. |
| --- | --- | --- |
| 375 | 10 | ½ |
| 400 | 5 | ½ |
| 450 | 20 | 1-2 |

After the ingot is retained in the electrolytic bath for the period to attain the desired diffusion depth, the voltage and current is removed from the electrodes and the alloyed germanium ingot is removed from the plating bath and permitted to cool.

When germanium material is used, it is found that a diffusion depth of 0.5 mm. to 2.0 mm. is an ideal range preparatory to carrying out the subsequent step of drifting the lithium material to provide a final lithium-drift solid state detector. For silicon material the preferred diffusion depth is in the range of approximately 0.1 mm. to 1.0 mm.

It is appreciated that for ingots of different sizes, different diffusion depths may be desired in which case the temperature of the bath and the duration of the electrolytic process may be adjusted accordingly. It is understood that this description of material mixtures, temperatures and electrolysis times are meant to be exemplary of the process and that other lithium salts in mixture with appropriate electrolyte carriers or other alkali salts might also be employed in different concentrations and at different temperature levels to secure desired lithium concentrations to other selected diffusion depths. Further, it is understood that others having reasonable skill in the art might make variations and modifications without departing from the inventive concept herein described and it is intended to cover in the appended claims all such variations and modifications as fall within the scope thereof.

What is claimed is:

1. A process for alloying lithium with a semi-conductor ingot comprising the steps of:
   (1) selecting an ingot of semi-conductor material,
   (2) preparing a mixture of lithium salt and a low temperature electrolytic carrier for reducing the melting point of the mixture to a temperature below that of the lithium salt,
   (3) heating said mixture to above the melting point thereof,
   (4) contacting an anode element and a cathode element to said heated mixture wherein said cathode element is the ingot of semi-conductor material,
   (5) applying a source of electric current across said anode and cathode elements,
   (6) regulating the current flow through said mixture to establish an effective electrolytic action in said mixture, and
   (7) maintaining said electrolytic action in said heated mixture for a period sufficient to secure diffusion of the lithium in the semi-conductor ingot to a predetermined depth.

2. A process for alloying lithium with a semi-conductor ingot comprising the steps of:
   (1) selecting an ingot of semi-conductor material,
   (2) preparing a mixture of lithium salt and a low temperature electrolytic carrier for reducing the melting point of the mixture to a temperature within the range of the optimum diffusion temperature of lithium in the selected semi-conductor material,
   (3) heating said mixture to a selected temperature in the range from 0° centigrade to 50° centigrade above the melting point thereof,
   (4) contacting an anode element and a cathode element to said heated mixture wherein said cathode element is the ingot of semi-conductor material,
   (5) applying a source of electric current across said anode and cathode elements,
   (6) regulating the current flow through said mixture to within a range of .01 ampere to .06 ampere per square centimeters of area of the cathode element contacting said heated mixture, and
   (7) maintaining said electrolytic action in said heated mixture for a period sufficient to secure diffusion of the lithium in the semi-conductor ingot to a predetermined depth.

3. A process for alloying lithium with a semi-conductor ingot comprising the steps of:
   (1) selecting an ingot of semi-conductor material,
   (2) preparing a mixture of lithium salt and a low temperature electrolytic carrier for reducing the melting point of the mixture to a temperature within the range of 350° to 600° centigrade,
   (3) heating said mixture to a selected temperature in the range from 0° centigrade to 50° centigrade above the melting point thereof,
   (4) contacting an anode element and a cathode element to said heated mixture wherein said cathode element is the ingot of semi-conductor material,
   (5) applying a source of electric current across said anode and cathode elements,
   (6) regulating the current flow through said mixture to within a range of .01 ampere to .06 ampere per square centimeters of area of the cathode element contacting said heated mixture, and
   (7) maintaining said electrolytic action in said heated mixture for a period sufficient to secure diffusion of the lithium in the semi-conductor ingot to a predetermined depth.

4. A process for alloying lithium with a semi-conductor ingot comprising the steps of:
   (1) selecting an ingot of semi-conductor material.
   (2) preparing a mixture of lithium salt and a low temperature electrolytic carrier for reducing the melting point of the mixture to a temperature within the range of 350° to 450° centigrade.
   (3) heating said mixture to a selected temperature in the range from 0° centigrade to 50° centigrade above the melting point thereof,
   (4) contacting an anode element and a cathode element to said heated mixture wherein said cathode element is the ingot of semi-conductor material,
   (5) applying a source of electric current across said anode and cathode elements,
   (6) regulating the current flow through said mixture to within a range of .01 ampere to .06 ampere per square centimeters of area of the cathode element contacting said heated mixture,
   (7) maintaining said electrolytic action in said heated mixture for a period sufficient to secure diffusion of the lithium in the semi-conductor ingot to a depth in the range of .1 to 2.0 millimeters, and
   (8) thereafter interrupting the electrolytic action and removing the semi-conductor ingot from the heated mixture to cool.

5. A process for alloying lithium with a semi-conductor ingot comprising the steps of:
   (1) selecting an ingot of semi-conductor material from the group including germanium and silicon,
   (2) preparing a mixture of lithium salt and a low temperature alkali salt for reducing the melting point of the mixture to a temperature within the range of 350° to 450° centigrade,
   (3) heating said mixture to a selected temperature in the range from 0° centigrade to 50° centigrade above the melting point thereof,
   (4) contacting an anode element and a cathode element to said heated mixture wherein said cathode element is the ingot of semi-conductor material,
   (5) applying a source of electric current across said anode and cathode elements,
   (6) regulating the current flow through said mixture to within a range of .01 ampere to .06 ampere per square centimeters of area of the cathode element contacting said heated mixture,
   (7) maintaining said electrolytic action in said heated mixture for a period sufficient to secure diffusion of the lithium in the semi-conductor ingot to a depth in the range of .1 to 2.0 millimeters, and
   (8) thereafter interrupting the electrolytic action and removing the semi-conductor ingot from the heated mixture to cool.

6. A process for alloying lithium with a semi-conductor ingot comprising the steps of:
   (1) selecting an ingot of semi-conductor material from the group including germanium and silicon,
   (2) preparing a mixture of lithium chloride and potassium chloride for reducing the melting point of the mixture to a temperature within the range of 350° to 450° centigrade,
   (3) heating said mixture to a selected temperature in the range from 0° centigrade to 50° centigrade above the melting point thereof,
   (4) contacting an anode element and a cathode element to said heated mixture wherein said cathode element is the ingot of semi-conductor material,
   (5) applying a source of electric current across said anode and cathode elements,
   (6) regulating the current flow through said mixture to within a range of .01 ampere to .06 ampere per square centimeter of area of the cathode element contacting said heated mixture, (7) maintaining said electrolytic action in said heated mixture for a period sufficient to secure diffusion of the lithium in the semi-conductor ingot to a depth in the range of .1 to 2.0 millimeters, and (8) thereafter interupting the electrolytic action and removing the semi-conductor ingot from the heated mixture to cool.

7. A process for alloying lithium with a semi-conductor ingot comprising the steps of:

(1) selecting an ingot of semi-conductor material from the group including germanium and silicon, (2) preparing a mixture of lithium chloride and potassium chloride in a one to one proportion thereby to establish a melting point for the mixture in the range of 370° to 400° centigrade, (3) heating said mixture to a selected temperature in the range from 0° centigrade to 50° centigrade above the melting point thereof, (4) contacting an anode element and a cathode element to said heated mixture wherein said cathode element is the ingot of semi-conductor material, (5) applying a source of electric current across said anode and cathode elements, (6) regulating the current flow through said mixture to within a range of .01 ampere to .06 ampere per square centimeter of area of the cathode element contacting said heated mixture, (7) maintaining said electrolytic action in said heated mixture for a period sufficient to secure diffusion of the lithium in the semi-conductor ingot to a depth in the range of .5 to 2.0 millimeters, and (8) thereafter interrupting the electrolytic action and removing the semi-conductor ingot from the heated mixture to cool.

References Cited
UNITED STATES PATENTS

| | | | |
|---|---|---|---|
| 3,147,152 | 9/1964 | Mendel | 148—1.5 |
| 3,290,179 | 12/1966 | Goulding | 148—1.5 |

JOHN H. MACK, *Primary Examiner.*

H. M. FLOURNOY, *Assistant Examiner.*